2,960,728
Patented Nov. 22, 1960

2,960,728

PREPARATION OF POROUS VINYL CHLORIDE POLYMER FILMS

Ludwig A. Beer, Agawam, Mass., assignor to Monsanto Chemical Company, St. Louis, Mo., a corporation of Delaware No Drawing. Filed Apr. 15, 1957, Ser. No. 652,676

5 Claims. (Cl. 18—57)

The present invention relates to methods of preparing porous films of vinyl chloride polymers.

There are many important industrial applications for porous or air-permeable films of vinyl chloride polymers. The presently employed methods for preparing such porous films comprise preparing a non-porous film by conventional techniques and subsequently punching holes in said film by mechanical means.

It is an object of this invention to provide a method for preparing porous films of vinyl chloride polymers.

Another object of this invention is to provide a method for preparing porous films of vinyl chloride polymers that can be readily adapted to continuous production methods.

Other objects and advantages of this invention will be apparent from the following detailed description thereof.

It has been discovered that porous films of vinyl chloride polymers can be prepared by forming a film from a vinyl chloride polymer plastisol or organosol which has incorporated therein a finely divided inorganic filler having water physically adsorbed thereon and subsequently heating the film to fuse the vinyl chloride polymer and plasticizer. The resulting product is a continuous plasticized vinyl chloride polymer film having a plurality of small pores or openings therein.

The following examples are set forth to illustrate more clearly the principle and practice of this invention to those skilled in the art. Where parts are mentioned, they are parts by weight.

Example I

A plastisol is prepared by dispersing 100 parts of a vinyl chloride homopolymer having an average particle size of 1 micron and 3 parts of a mixed barium and cadmium stabilizer in 60 parts of di-(2-ethylhexyl)phthalate. Fifteen parts of sodium aluminum silicate having 15 parts of water adsorbed thereon are homogeneously incorporated in 100 parts of the plastisol. The sodium aluminum silicate employed has a particle size in the range of 0.5–5 microns.

A 15 mil film of the plastisol is coated on a metal plate and the wet film is prefused at 100° C. for 15 minutes and then fused by heating for 15 minutes at 165° C. The resulting film is strong, flexible and quite porous as indicated by the fact that 220 ml. of air will pass through 1 square inch of the 15 ml. film in 65 seconds in a Gurley porosity test (ASTM method D726–4A, TAPPI Standard Method T46m–49).

Example II

Example I is repeated except that the sodium aluminum silicate employed is replaced with a calcium aluminum silicate having the same particle size distribution. Comparable results are obtained.

Example III

Example I is repeated except that 6 parts of fuller's divided silica having 14 parts of water adsorbed thereon are incorporated in 100 parts of the vinyl chloride plastisol. The silica employed has an average particle size of 0.03 micron. Essentially comparable results are obtained.

Example IV

Example I is repeated except that 6 parts of fuller's earth having 14 parts of water absorbed thereon are incorporated in 100 parts of the vinyl chloride plastisol. Comparable results are obtained.

The vinyl chloride polymer plastisols employed in the process of this invention are conventional except for the fact that they have incorporated therein a finely divided inorganic filler having water physically adsorbed thereon. The quantity of the inorganic filler employed is sufficient to provide at least 2 parts of water per 100 parts of plastisol and more preferably 5 to 20 parts of water per 100 parts of plastisol. The finely divided inorganic filler employed should have a particle size of less than about 5–10 microns and should be able to physically adsorb water in the amount of at least about 50% of its own weight while still retaining its particulate and flowable characteristics. Typical examples of such inorganic fillers include carbon blacks, natural and treated clays, fuller's earth, finely ground natural pigments such as alumina, bauxite, etc., various commercially available water-insoluble inorganic salts such as calcium silicate, metallic oxides such as various natural silicas, iron oxide, alumina, thoria, etc. Water may be adsorbed on the inorganic fillers by simply adding liquid water to the finely divided filler in any suitable blender such as ball mills, ribbon blenders, etc.

Vinyl chloride polymer plastisols per se are well known in the art and as a result are not described herein in detail. In general, such plastisols comprise a dispersion of a finely divided vinyl chloride polymer, e.g., average particle sizes of 0.02–2.0 microns, in a plasticizer threfor. In the usual case, 100 parts of the vinyl chloride polymer are dispersed in from 50 to 200 parts of the plasticizer. In some cases, the plastisol may also contain small quantities of 1 or more volatile organic solvents. Such solvent-containing plastisols are sometimes referred to in the art as "organosols." The vinyl chloride polymers employed in the plastisols may be homopolymers of vinyl chloride or copolymers of vinyl chloride with vinyl acetate, vinylidene chloride, acrylate esters, etc. Where copolymers are employed, they should contain at least 50 weight percent of vinyl chloride. The plasticizers employed are usually of the ester type such as di-(2-ethylhexyl) phthalate, dibutyl phthalate, diisodecyl phthalate, tricresyl phosphate, etc. Stabilizers, colorants and other conventional compounding ingredients may be included in the plastisol if desired.

The films of the vinyl chloride polymer plastisols containing the finely divided inorganic fillers having water physically adsorbed thereon can be prepared by any conventional film-forming methods such as knife-coating, spraying, reverse roll-coating, calendering, etc. The plastisol films are gelled and converted into a continuous plastic film by heating to temperatures of about 150° C. or above by any conventional heating method such as hot-air ovens, infra-red heaters, etc. The porous vinyl chloride polymer films can be prepared as unsupported films or may be prepared upon any suitable support such as fabrics, paper, etc.

The porous vinyl chloride films of this invention, either as supported and/or unsupported films, may be employed as upholstering materials, as a bandage backing, etc. and in other applications where an air and/or water vapor permeable plastic film is desired.

The above descriptions and particularly the examples are set forth by way of illustration only. Many other variations and modifications thereof will be apparent to those skilled in the art and can be made without departing from the spirit and scope of the invention herein described.

What is claimed is:

1. In the method for preparing a film of a plasticized vinyl chloride polymer in which a dispersion of a vinyl chloride polymer in a plasticizer therefore is cast into a thin film and fused by heating to a temperature of at least 150° C.; the improvement which comprises incorporating in the dispersion of the vinyl chloride polymer an inorganic filler having a particle size of less than about 10 microns and having adsorbed thereon water in the amount of at least about 50% of its weight, said filler being present in an amount sufficient to provide 2–20 parts of water per 100 parts of combined vinyl chloride polymer and plasticizer.

2. The method of claim 1 wherein the finely divided inorganic filler included in the vinyl chloride polymer dispersion is calcium aluminum silicate.

3. The method of claim 1 wherein the finely divided inorganic filler included in the vinyl chloride polymer dispersion is sodium aluminum silicate.

4. The method of claim 1 wherein the finely divided inorganic filler included in the vinyl chloride polymer dispersion is a silica filler.

5. The method of claim 1 wherein the finely divided inorganic filler included in the vinyl chloride polymer dispersion is fuller's earth.

References Cited in the file of this patent

UNITED STATES PATENTS

| | | |
|---|---|---|
| 2,302,833 | Behrman | Nov. 24, 1942 |
| 2,386,995 | Wigal | Oct. 16, 1945 |
| 2,518,454 | Ellicott | Aug. 15, 1950 |
| 2,575,046 | Chavannes et al. | Nov. 13, 1951 |
| 2,760,941 | Iler | Aug. 28, 1956 |
| 2,772,322 | Witt et al. | Nov. 27, 1956 |

UNITED STATES PATENT OFFICE
CERTIFICATION OF CORRECTION

Patent No. 2,960,728

November 22, 1960

Ludwig A. Beer

It is hereby certified that error appears in the above numbered patent requiring correction and that the said Letters Patent should read as corrected below.

Column 1, line 59, for "ml." read -- mil --; line 70, for "fuller's" read -- a finely --.

Signed and sealed this 23rd day of May 1961.

(SEAL)
Attest:

ERNEST W. SWIDER
Attesting Officer

DAVID L. LADD
Commissioner of Patents